Patented Dec. 8, 1936

2,063,449

UNITED STATES PATENT OFFICE 2,063,449

PROCESS FOR CONTROLLING HYDROGEN ION CONCENTRATION OF BUTYL ALCOHOL FERMENTATION MASHES

David A. Legg, Terre Haute, Ind., assignor to Commercial Solvents Corporation, Terre Haute, Ind., a corporation of Maryland No Drawing. Application February 12, 1934, Serial No. 710,898

3 Claims. (Cl. 195—44)

The present invention relates to the control of the hydrogen ion concentration in the fermentation of soluble carbohydrate mashes by butyl alcohol producing bacteria. More specifically, this invention relates to the regulation of the hydrogen ion concentration in fermentations by various types of butyl alcohol producing bacteria, utilizing as the regulating means certain specific types of basic carbonates hereinafter described.

It has recently been found, as disclosed in copending applications Serial Numbers 650,036, 675,458 and 675,459, that the fermentation of soluble carbohydrate mashes by means of butyl alcohol producing bacteria of the types which are unable to produce high yields of solvents from cereal mashes without the addition of special nutrients or the like is aided by the presence of a slight excess of a non-toxic insoluble neutralizing agent. However, in spite of the generally improved yields obtained by the use of such materials, variable results have been secured in these fermentations, and up to the present time, it has been difficult to secure reproducible optimum conditions for any given culture of butyl alcohol producing bacteria.

I have now found that these variable results have, in many cases, been due to the indiscriminate use of calcium carbonates or other neutralizing agents without regard to their physical form and average particle size. I have discovered that for any particular type of butyl alcohol producing bacteria under any specific fermentation conditions a definite type of neutralizing agent is required for optimum solvent yields. One of the purposes of the present invention, therefore, is the determination of the type of neutralizing agent for use with any given type of butyl alcohol producing bacteria of the group which is characterized by inability to produce high solvent yields from cereal mashes without the addition of special nutrients or the like.

Fermentations by this group of butyl alcohol producing bacteria will be found to vary considerably in their activity, that is, in the rapidity with which the "acidity peak" is reached and solvent production commences. This activity will depend largely upon the particular culture of bacteria employed but will also depend to a certain extent on the fermentation conditions. For example, fermentation of a pure sugar mash will usually be more active than the fermentation of a molasses mash by the same bacteria. Likewise, the fermentation of one type of molasses may be more active than that of another type due to differing concentrations of inhibiting substances. Other fermentation conditions will, likewise, affect the activity of the fermentation, depending upon their relation to optimum conditions.

I have found that in general the neutralizing agent to be employed in any given case should be chosen in accordance with the activity of the fermentation. The more active the fermentation, the larger should be the average size of the particles and aggregates of the neutralizing agents and vice versa. The theory underlying this discovery is not definitely understood. It is believed, however, that the choice of the correct type of neutralizing agent results in the neutralizing action coming into play at the time when most needed—probably at the acidity peak of the fermentation. The available surface of the neutralizing agent will depend not only upon the surfaces of the settled layer at the bottom of the vessel but also upon the surfaces of the individual particles suspended above this layer. This latter will in turn depend upon the buoyancy of the particles at any given time during the fermentation. It is believed that in a very active fermentation the gas evolution is so rapid that a neutralizing agent of very small particle size will rapidly be carried up into the mash before the acidity peak is reached. On the other hand, in a less active fermentation too coarse a material may not be carried into suspension even at the height of the fermentation and thus will be at least partially ineffective for neutralizing purposes. There is some experimental evidence in favor of this theory, but it is to be distinctly understood that my invention is not to be limited to any particular theory by which it may operate.

The neutralizing agents suitable for use in my invention may be any of the non-toxic insoluble basic materials referred to in the co-pending patent applications mentioned above, for example, calcium carbonate, barium carbonate, iron carbonate, and the like. These materials may, likewise, be utilized in the concentrations disclosed in said applications, for example, from 3 to 10% in excess of that necessary for the neutralization of the initial acidity of the mash, based on the weight of the carbohydrate in the mash. In general, from 5 to 7% on the weight of the carbohydrate will be found to be satisfactory. However, my invention is not to be limited to particular concentrations, since I have discovered that the physical form and particle size of the material are of much more importance than the concentration, so long as a slight excess is present.

With respect to the physical form and size of the neutralizing agent, quite a wide range of materials will be found to be satisfactory depending upon the activity of the particular fermentation. However, for most fermentations by this type of butyl alcohol producing bacteria a rather narrow range of materials will be found to be satisfactory. Taking calcium carbonate as an example, it will be found that materials ranging from 100 mesh ground limestone to freshly precipitated calcium carbonate will be found to be satisfactory for most fermentations.

All of these materials are readily available or may readily be prepared by those skilled in the art. The coarser materials, such as ground limestone and chalk are always available commercially. Intermediate grades are usually available or may be prepared by subjecting the coarser materials to further grinding. The finer materials are available in the form of precipitated calcium carbonate of the type sold commercially for cosmetic purposes, and even finer material may be prepared by precipitating the calcium carbonate in the presence of a crystallization inhibitor. The freshly precipitated material, if used before drying or before any sintering action has taken place, will be found to give a finer suspension than any of the other materials which are readily available. The use of even finer materials is included in the scope of my invention, but it is probable that such materials would be uneconomical, since they would be expensive to produce and would be applicable for use only with a very sluggish type of fermentation.

The choice of a suitable calcium carbonate or other insoluble non-toxic neutralizing agent may readily be made on the basis of particle size or on the basis of a simple settling test from an aqueous suspension. An example of the latter type of test is illustrated below.

Suspensions of 1.5 grams of each of a number of calcium carbonates in 500 cc. of distilled water were placed in 500 cc. graduated cylinders. The contents of the graduates were shaken by inverting twelve times and were then allowed to settle. At intervals the apparent volume of solids on the bottom and the degree of turbidity were noted. The results obtained for four types of calcium carbonate are recorded in the table below.

Table I

| Type of carbonate | Apparent volume of solids on bottom in cc. | | | | Turbidity* | | | |
|---|---|---|---|---|---|---|---|---|
| | 11 min. | 21 min. | 41 min. | 56 min. | 11 min. | 21 min. | 41 min. | 56 min. |
| Wet CaCO₃ precipitated from lime by fermentation gas | 6.0 | 7.5 | 8.5 | 9.0 | M | M | M-L | L |
| Cosmetic grade precipitated CaCO₃ | 2.5 | 3.0 | 4.0 | 4.5 | D | D | M-D | M |
| Commercial ground chalk | 3.5 | 3.7 | 4.0 | 4.0 | M | M | L | L |
| 200 mesh ground limestone | 5.0 | 5.0 | 5.5 | 5.5 | M-L | L | L | L-C |

* D=dense
M=medium
L=light
C=clear

It may be seen from the above results that the settling test does not give absolutely comparative results since the distribution of various particle sizes in a given sample of material may vary considerably. Thus, in the above table the cosmetic grade of precipitated calcium carbonate gave even a lower apparent volume of solids in the bottom of the cylinder than the ground calcites. However, in this case the supernatant liquid was much more turbid than in the case of the other precipitated carbonates, indicating the presence of a considerable amount of very small particles. It is seen therefore that in the case of the precipitated calcium carbonates either the apparent volume of solids was greater or the turbidity of the supernatant liquid was greater than in the case of the ground calcites. This test therefore should be sufficient in most cases to enable one skilled in the art to choose a suitable type of calcium carbonate.

Although the mass and apparent density of the particles would be a more accurate criterion because of differences in surface structure and porosity of the particles, a sufficiently accurate determination for most purposes may be made by ascertaining the average size of the particles and aggregates. Such measurements will be found in most cases to follow closely the results obtained in the settling test as will be shown by the results below.

Table II

| Type of Carbonate | Size of particles μ | Size of aggregates μ |
|---|---|---|
| Wet CaCO₃ precipitated from lime by fermentation gas | 0.51–1.02 | 2.9–12.8 |
| Cosmetic grade precipitated CaCO₃ | 0.02–1.41 | 2.6–13.8 |
| Commercial ground chalk | 1.92–3.58 | 6.3–31.9 |
| 200 mesh ground limestone | 2.17–4.10 | 9.9–26.6 |

The above results were secured by examining a drop of a distilled water suspension containing three grams per liter of calcium carbonate. The drop was mounted in a quartz chamber and examined in a dark field with a microscope fitted with a calibrated drum micrometer.

It may be seen from the above results that a marked difference exists between the precipitated calcium carbonates and the commercial grades of ground calcite. Thus, it is believed to be evident that by means of a determination of both particle size and settling time one skilled in the art may readily choose a neutralizing agent sufficiently finely divided to remain in suspension to the desired extent during the fermentation and thus to maintain the optimum hydrogen ion concentration.

The activity of the fermentation for which the calcium carbonate or other neutralizing agent is to be chosen may be determined in any way known to those skilled in the art. For one who has worked with this group of bacteria for a sufficient length of time a simple observation of a test fermentation, noting the rapidity of gas evolution at different stages of the fermentation, would probably suffice for this purpose. A determination of the acidity curve for the fermentation would constitute a more accurate observation and would indicate the activity on the basis of time necessary to reach the acidity peak. However, in all cases, a simple test will determine both the activity of the fermentation and the type of calcium carbonate to be employed. Such a test would comprise merely a preliminary series of fermentations employing 3 or 4 different grades of material as the neutralizing agent. Such a test is applied to two representative members of this group of (non-starch-fermenting) butyl alcohol bacteria as represented below.

The bacteria which have been designated *Clostridium propyl butylicum* in the present invention and which are so designated in the appended claims, comprise any bacteria having the following primary characteristics:
I. Morphological
  A. Rod-shaped
  B. Spore-forming—Clostridia and Plectridia
  C. Practically indistinguishable from members of the *Clostridium butyricum* group
II. Biochemical
  A. Carbohydrate fermentation
    1. Inability to produce appreciable yields of butyl and isopropyl alcohols from starch as the only source of carbohydrate
    2. Inability to produce appreciable yields of butyl and isopropyl alcohols from sucrose as the only source of carbohydrate
    3. Inability to consistently produce yields greater than 20% calculated on the weight of the sugar from uninverted molasses
    4. Ability to produce high yields of butyl and isopropyl alcohols from glucose or inverted molasses
  B. Nitrogen metabolism
    1. Ability to produce high yields of butyl and isopropyl alcohols in sugar media containing ammonia as the principal source of nitrogen.
    2. Ability to utilize degraded protein (including ammonia) as sole nitrogen source
    3. Inability to utilize undegraded protein as sole source of nitrogen
    4. Inability to liquefy gelatin or to produce more than very slight proteolysis of milk
  C. Oxygen requirements
    1. Anaerobic
  D. Temperature range for solvent production
    1. From 25° C. to 36° C., preferably 29° C. to 31° C.
  E. Hydrogen ion concentration for solvent production
    1. Final pH of 5.0–6.5, preferably 5.8–6.1

The bacteria designated herein as *Clostridium inverto-acetobutylicum* comprise any bacteria having the following primary characteristics:

I. Morphological
  A. Rod-shaped
  B. Spore-forming—Clostridia and Plectridia
  C. Practically indistinguishable from members of the *Clostridium butyricum* group
II. Biochemical
  A. Carbohydrate fermentation
    1. Inability to produce appreciable yields of butyl alcohol and acetone from starch as the only source of carbohydrate
    2. Inability to produce appreciable yields of butyl alcohol and acetone from sucrose as the only source of carbohydrate
    3. Inability to consistently produce yields greater than 20% calculated on the weight of the sugar from uninverted molasses
    4. Ability to produce high yields of butyl alcohol and acetone from glucose or inverted molasses.
  B. Nitrogen metabolism
    1. Ability to produce high yields of butyl alcohol and acetone in sugar media containing ammonia as the principal source of nitrogen
    2. Ability to utilize degraded protein (including ammonia) as sole nitrogen source
    3. Inability to utilize undegraded protein as sole source of nitrogen
    4. Inability to liquefy gelatin or to produce more than very slight proteolysis of milk
  C. Oxygen requirements
    1. Anaerobic
  D. Temperature range for solvent production
    1. From 25° C. to 36° C., preferably 29° C. to 31° C.
  E. Hydrogen ion concentration for solvent production
    1. Final pH of 5.0–6.5, preferably 5.7–6.1

The bacteria designated herein as *Clostridium saccharo-acetobutylicum* comprise any bacteria having the following primary characteristics:

I. Morphological
  A. Rod-shaped
  B. Spore-forming—Clostridia and Plectridia
  C. Practically indistinguishable from members of the *Clostridium butyricum* group
II. Biochemical
  A. Carbohydrate fermentation
    1. Ability to produce fair yields of butyl alcohol and acetone consistently from starch as the sole source of carbohydrate (i. e., corn or other mash containing starch and suitable nutrients)
    2. Ability to produce yields of butyl alcohol and acetone consistently above 30% on the weight of the sugar from 5% sucrose media or 5.5% uninverted molasses medium containing about 0.3% $(NH_4)_2SO_4$ and about 0.4% of 200 mesh calcite, based on the mash volume
    3. Ability to produce yields of butyl alcohol and acetone consistently above 30% on the weight of the sugar from 5% glucose media with suitable nutrients, or an inverted molasses medium corresponding to the uninverted molasses medium of (2) above
  B. Nitrogen metabolism
    1. Ability to produce high yields of butyl alcohol and acetone in sugar media containing ammonia as the principal source of nitrogen
    2. Ability to utilize degraded protein (including ammonia) as sole nitrogen source
    3. Inability to utilize undegraded protein as sole source of nitrogen
    4. Inability to liquefy gelatin or to produce more than very slight proteolysis of milk
  C. Oxygen requirements
    1. Anaerobic
  D. Temperature range for solvent production
    1. From 24° C. to 40° C., preferably 29° C. to 30° C.
  E. Hydrogen ion concentration for solvent production
    1. Final pH of 5.0–6.2, preferably 5.4–5.85

An inverted molasses mash containing about 0.7% ammonia on the weight of the sugar was prepared according to the standard procedure as set forth in co-pending application Serial Number 650,036, and different types of calcium carbonate were added to 3 liter quantities of the mash in 4 liter Erlenmeyer flasks in an amount of 0.4% based on the weight of the mash. Duplicate flasks for each type of calcium carbonate were sterilized and inoculated with a culture of the type *Clostridium propyl butylicum* and the fermentations carried out in the known manner. A similar series of flasks of uninverted molasses mash, prepared according to the standard procedure set forth in co-pending application Serial Number 675,459, were iniculated with *Clostridium saccharo acetobutylicum* and the fermentations carried out in the known manner. The results of these fermentations are reported in Table III below.

*Table III*

| Type of Neutralizing Agent | Yield, % calculated on sugar | |
|---|---|---|
| | Cl. propyl butylicum | Cl. saccharo-acetobutylicum |
| 200 mesh ground limestone | 28.8 | 35.8 |
| Commercial ground chalk | 28.5 | 33.5 |
| Freshly precipitated calcium carbonate | 30.4 | 30.9 |

It may be seen from the above table that the *Clostridium saccharo acetobutylicum* fermentation represents an active type which requires a relatively coarse neutralizing agent for optimum results, whereas the *Clostridium propyl butylicum* fermentation is a more sluggish type which requires a very finely divided neutralizing agent. Although most of the fermentations by this group of bacteria will fall within the limits of activity represented by these two examples, there may be particular fermentations which fall outside these limits. However, in any case, a simple test such as that outlined above, and utilizing a somewhat wider range of neutralizing agents, will indicate the correct material for the particular fermentation. An even simpler determination could be made by one skilled in this particular fermentation field by merely carrying out preliminary fermentations by the organism in question and by *Clostridium propyl butylicum* and *Clostridium saccharo acetobutylicum* as standards of reference. By a comparison of the activity of the new fermentation with that of the two standards, a type of neutralizing agent could be chosen which either fell intermediate between the two materials for the standards or fell outside this range at either end, as the case might be.

Although it is recognized that the various fermentations by this group of bacteria may have degrees of activity varying all the way from the most active to the least active, for practical purposes they may be roughly divided into two groups which may be termed the active and the sluggish types. For the active type, such as the members of the *Clostridium saccharo acetobutylicum* group and particularly *Clostridium saccharo acetobutylicum-α*, it will generally be found that neutralizing agents having a degree of fineness of the order of 100 to 300 mesh limestone will be satisfactory. For the other type, represented by members of the *Clostridium propyl butylicum* and *Clostridium inverto acetobutylicum* groups, neutralizing agents of a degree of fineness ranging from cosmetic grades of dry precipitated calcium carbonate to wet freshly precipitated calcium carbonate will generally be found to be most satisfactory.

It is to be understood, of course, that this invention is not to be limited to the specific examples given above. Although the invention was illustrated in connection with the fermentation by certain specific bacteria, it is applicable generally to fermentations by means of butyl alcohol producing bacteria of the type characterized by their inability to produce high yields of solvents from cereal mashes without the addition of special nutrients or the like. Likewise, the invention is not to be limited to any of the particular types of neutralizing agents mentioned, nor to the particular amounts specified. Various modifications and improvements may also be incorporated in applying my invention. For example, after determining the particular type of neutralizing agent to be employed in accordance with the present invention, this may then be modified, if necessary, to accommodate for the particular type of fermentation vessel employed, as disclosed in co-pending application Serial No. 710,897, filed February 12, 1934. In general, it may be said that any modifications or the use of any equivalents which would naturally occur to one skilled in the art are included within the scope of this invention.

For the sake of simplicity in terminology in the appended claims, the bacteria to which this invention is applicable are designated as "non-starch fermenting butyl alcohol producing bacteria". It is to be distinctly understood, however, that this term is not limited to those organisms which are unable to attack starch to any substantial extent. The term includes such organisms but also includes organisms which may have the ability to ferment starch to a considerable extent but which are unable to produce high yields of solvents from cereal mashes without the addition of special nutrients, buffering materials or other modifying agents.

The invention now having been described, what I claim is:

1. In the art of fermenting soluble carbohydrate mashes by means of non-starch fermenting butyl alcohol producing bacteria whose metabolic functions are favored by a hydrogen ion concentration lower than that secured by the normal activity of the organisms in said mash, and in which the fermentation is effected in the presence of a finely divided non-toxic insoluble basic neutralizing agent in slight excess over that required to neutralize initial acidity, the method of controlling the hydrogen ion concentration to secure reproducible optimum conditions for the production of solvents comprising, first, determining the normal activity of fermentation of the bacteria to be employed, in the particular mash to which the said neutralizing agent is to be added, then selecting said neutralizing agent having a certain degree of fineness, between 100 mesh and that of freshly precipitated material, such that it will remain partially but not completely in suspension during the rapid gas evolution stage of the fermentation, thus maintaining optimum hydrogen ion concentration, the selection of the grade of said neutralizing agent being determined by the rule that the higher said bacterial activity, the coarser will be the neutralizing agent selected, while the lower said bacterial activity, the finer will be the neutralizing agent selected, and then adding said neutralizing agent to the mash in slight excess over that required to neutralize initial acidity.

2. In the art of fermenting soluble carbohydrate mashes by means of non-starch fermenting butyl alcohol producing bacteria whose metabolic functions are favored by a hydrogen ion concentration lower than that secured by the normal activity of the organisms in said mash, and in which the fermentation is effected in the presence of a finely divided non-toxic insoluble basic neutralizing agent in slight excess over that required to neutralize initial acidity, the method of controlling the hydrogen ion concentration to secure reproducible optimum conditions for the production of solvents comprising, first, determining the relative normal activity of fermentation of the bacteria to be employed, in the particular mash to which the said neutralizing agent is to be added, using as a standard of comparison, the fermentation activity, under similar conditions, of bacteria from the groups consisting of Clostridium propyl butylicum and Clostridium saccharo acetobutylicum, then selecting said neutralizing agent having a certain degree of fineness, between 100 mesh and that of freshly precipitated material, such that it will remain partially but not completely in suspension during the rapid gas evolution stage of the fermentation, thus maintaining optimum hydrogen ion concentration, the selection of the grade of said neutralizing agent being determined by the rule, that the higher said bacterial activity, the coarser will be the neutralizing agent selected, while the lower said bacterial activity, the finer will be the neutralizing agent selected, and then adding said neutralizing agent to the mash in a concentration of about 3-10%, based on the weight of the carbohydrate, in excess of that necessary to neutralize the initial acidity of the mash.

3. In the art of fermenting soluble carbohydrate mashes by means of non-starch fermenting butyl alcohol producing bacteria whose metabolic functions are favored by a hydrogen ion concentration lower than that secured by the normal activity of the organisms in said mash, and in which the fermentation is effected in the presence of a finely divided non-toxic insoluble basic neutralizing agent in slight excess over that required to neutralize initial acidity, the method of controlling the hydrogen ion concentration to secure reproducible optimum conditions for the production of solvents comprising first, determining the relative normal activity of fermentation of the bacteria to be employed, in the particular mash to which the said neutralizing agent is to be added, using as a standard of comparison, the fermentation activity, under similar conditions, of bacteria from the group consisting of Clostridium propyl butylicum and Clostridium saccharo acetobutylicum, then selecting said neutralizing agent having a degree of fineness, of the order 100 to 300 mesh when the fermentation resembles most closely that of Clostridium saccharo acetobutylicum and of a degree of fineness ranging from cosmetic grades to freshly precipitated material, when the fermentation resembles most closely that of Clostridium propyl butylicum, the neutralizing agent selected having such a certain degree of fineness, that it will remain partially but not completely in suspension during the active gas evolution stage of the fermentation, thus maintaining optimum hydrogen ion concentration, and then adding said neutralizing agent to the mash in a concentration of about 3-10%, based on the weight of the carbohydrate, in excess of that necessary to neutralize the initial acidity of the mash.

DAVID A. LEGG.